Nov. 16, 1954
R. W. PHILLIPS ET AL
2,694,402
LIQUID METERING MECHANISM IN COMBINATION WITH
CONTAINER CLEANSING AND SANITIZING MACHINES
Filed April 17, 1950
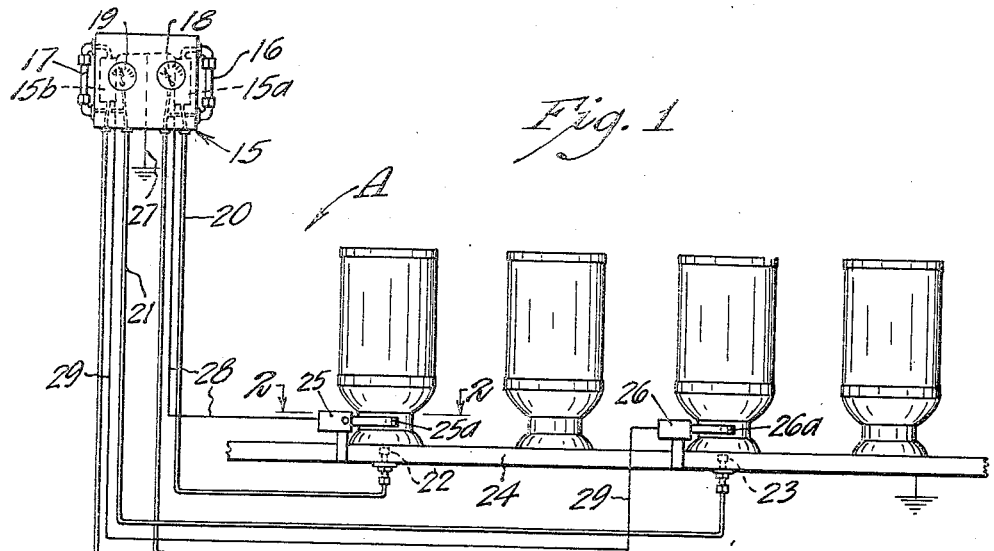
Fig. 1
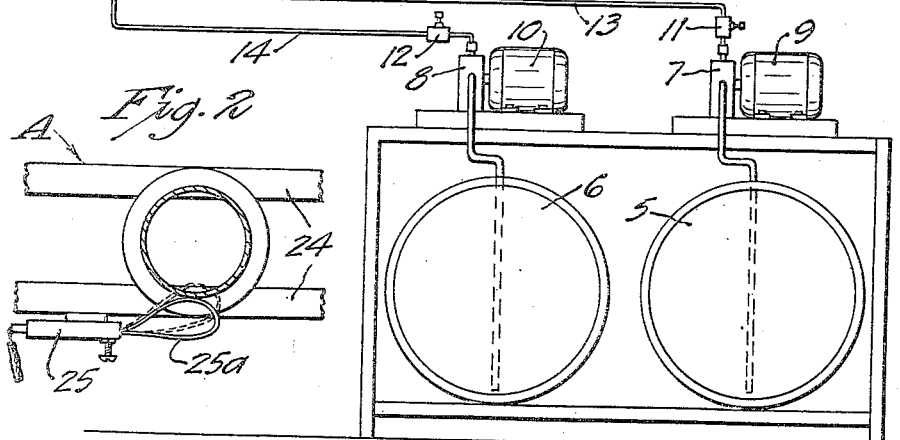
Fig. 2
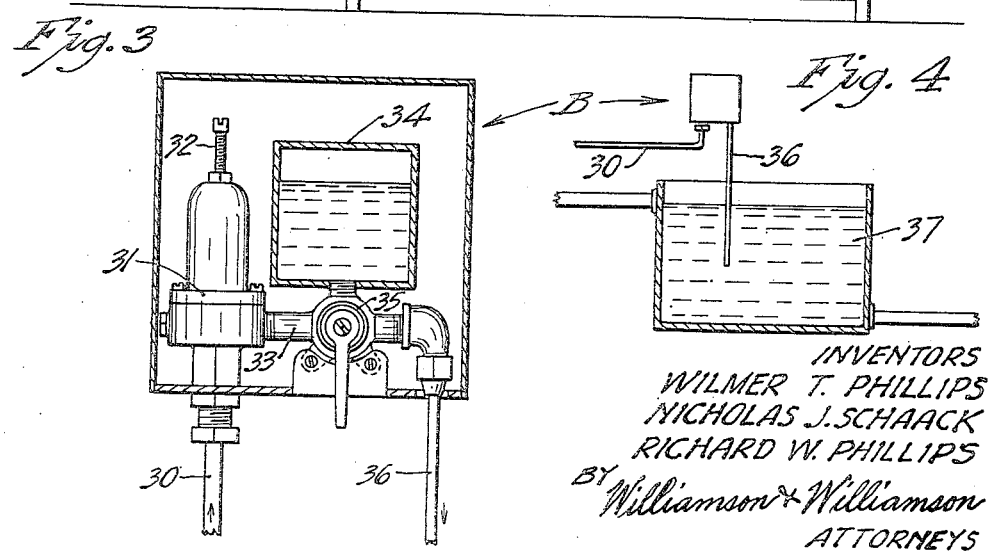
Fig. 3
Fig. 4
INVENTORS
WILMER T. PHILLIPS
NICHOLAS J. SCHAACK
RICHARD W. PHILLIPS
BY Williamson & Williamson
ATTORNEYS – # United States Patent Office 2,694,402
Patented Nov. 16, 1954

2,694,402

LIQUID METERING MECHANISM IN COMBINATION WITH CONTAINER CLEANSING AND SANITIZING MACHINES

Richard W. Phillips and Wilmer T. Phillips, River Falls, and Nicholas J. Schaack, Prescott, Wis.

Application April 17, 1950, Serial No. 156,296

1 Claim. (Cl. 134—46)

This invention relates to mechanism for automatically measuring a predetermined volume of fluid to be discharged through an opening in combination with a container cleansing and sanitizing machine.

In the past it has been a problem to accurately measure cleaning fluid, such as a detergent liquid or sanitizer liquid, in order to prevent wasting thereof when carrying out a cleansing operation.

It is an object of our invention to provide a novel and highly efficient mechanism for discharging a precisely predetermined volume of fluid through an orifice to permit accurately controlled metering thereof in combination with a container cleansing and sanitizing mechanism.

It is another object to provide a fluid metering mechanism in combination with container washers and sanitizers for controlling the volume of discharge of liquid by an accurate control of the interval of discharge.

These and other objects and advantages of our invention will more fully appear from the following description made in connection with the accompanying drawings wherein like reference characters refer to similar parts throughout the several views and in which:

Fig. 1 is a diagrammatic view showing one embodiment of our invention in the form of a milk can cleaning system, with a metering mechanism for controlling the volume of detergent as well as sanitizer discharged for cleaning;

Fig. 2 is a fragmentary horizontal sectional view taken substantially along the line 2—2 of Fig. 1;

Fig. 3 is an alternative form of metering device; and

Fig. 4 shows the device illustrated in Fig. 3 in assembled position.

As shown in Fig. 1 of the drawings, a milk or cream can cleansing and sanitizing system is illustrated, having a storage tank 5 for the cleansing liquid or detergent, and a storage tank 6 for the sanitizer liquid. A pair of rotary pumps 7 and 8 respectively driven by the motors 9 and 10 are respectively connected to the tanks 5 and 6 to pump the liquid therefrom. A pair of pressure control valves 11 and 12 respectively control the discharge pressure from the pumps 7 and 8 so that the pressure in the discharge lines 13 and 14 remains respectively constant at the selected adjusted pressure of the valves 11 and 12. The discharged liquid through the conduits 13 and 14 is carried respectively to a pair of solenoid valves 15a and 15b mounted within the casing 15, and this liquid from the lines 13 and 14 respectively passes through a pair of flow detection glasses 16 and 17 into the respective solenoid valves. The casing 15 has a pair of pressure gauges 18 and 19 mounted therein and respectively connected to the flow lines 13 and 14. The solenoid valves in the casing 15 control the flow to the discharge conduits 20 and 21 which extend respectively to the supply nozzles 22 and 23 which are provided with an orifice of a predetermined size to permit precise metering of the liquid passing therethrough. A conveyor 24 carries the cans to be cleaned and a pair of electric contact units 25 and 26 are mounted on the side of the frame of the conveyor 24. The frame is electrically grounded in contact with the ground leads 27 from the solenoids 15a and 15b. The cans travelling on the conveyor are grounded to the conveyor frame.

A pair of resilient can engaging conductor straps 25a and 26a are respectively connected to contact units 25 and 26 and normally extend outwardly into the path of the cans being carried in upside-down position on the conveyor 24, and when these straps are engaged by a can electrical contact is made with the can which is, of course, grounded through the conveyor to respectively complete the circuit through the solenoid valves 15a and 15b to which the contact units 25 and 26 are respectively connected by the lines 28 and 29. The conveyor travels at a predetermined speed, and therefore the interval of contact between the straps and the cans will be constant and will permit a precisely predetermined volume of liquid to be discharged through the spray nozzles 22 and 23. The form of our invention illustrated in Figs. 1 and 2 is designated as an entirety by the letter A.

Figs. 3 and 4 illustrate another form of our invention designated as an entirety by the letter B. In form B of our invention a line 30 is connected to a source of liquid detergent supply or liquid sanitizer supply and carries the flow therefrom to an adjustable pressure control valve 31 having the pressure adjustment screw 32. This valve is of conventional construction and is designed to maintain a predetermined adjusted pressure in the line 33 which is connected to a closed metering chamber 34 and has a three way valve 35 interposed in said line. The valve 35 in the form shown in a manually operated valve which may be set in two positions. In one position the flow of liquid is directed into the metering chamber 34 and the liquid flows into said chamber until the pressure therein equals the pressure of liquid in the line 33. When the liquid stops flowing into the chamber 34 a precisely predetermined volume of liquid will be contained in said chamber and the valve 35 is then turned to its second position which directs the flow of liquid from the chamber 34 into a supply line 36 which, as shown in Fig. 4, is connected to a water tank 37 to mix a predetermined volume of detergent or sanitizer liquid into the liquid of the water tank 37 from which the solution may be carried to any part of an industrial plant.

It will be seen that in both forms A and B of our invention that we have provided precise metering devices for discharging a predetermined volume of liquid through a discharge outlet. In form A of our invention it is the accurate control of the time interval of discharge of liquid under predetermined pressure through an orifice of a predetermined size. In form B it is the discharge of liquid under a predetermined pressure into a chamber of predetermined size and having enclosed therein a predetermined volume of compressible fluid such as air so that at the same pressure the same volume of liquid will always flow into said chamber wherein the pressure will be equalized with the line pressure. It should be noted that both forms of our invention are particularly adapted for use with a central source of liquid supply, such as sanitizer or detergent, and which will permit piping this liquid at a predetermined pressure throughout an entire industrial plant and provide precise metering of the liquid discharge at the desired points throughout the plant.

It will, of course, be understood that various changes may be made in the form, details, arrangement and proportions of the parts without departing from the scope of our invention.

What we claim is:

A liquid metering system in combination with a container cleansing and sanitizing machine comprising an electrical circuit, a conductive supporting structure, a conveyor mounted on said supporting structure and carrying in electrical contact with the supporting structure a plurality of conductive containers, each having an opening therein, a discharge nozzle having a liquid supply conduit connected therewith and positioned to direct a spray of liquid into each of said containers through the opening therein, a resiliently yieldable electrical contact element connected in said circuit and positioned relative to said conveyor to successively engage the containers whereby said containers close the circuit to said conductive supporting structure, and a solenoid valve electrically connected in said circuit and responsive, for opening, to the closing of said circuit through the supporting structure said valve being interposed into said liquid supply conduit to control the flow of liquid to said nozzle.

(References on following page)

References Cited in the file of this patent

UNITED STATES PATENTS

| Number | Name | Date |
|---|---|---|
| 1,512,918 | Forsgard | Oct. 28, 1924 |
| 1,902,238 | Hippenmeyer | Mar. 21, 1933 |
| 1,930,983 | Russell | Oct. 17, 1933 |
| 2,025,571 | Clark | Dec. 24, 1935 |
| 2,321,573 | Chace | June 15, 1943 |
| 2,345,076 | Spencer | Mar. 28, 1944 |
| 2,357,786 | Wells | Sept. 5, 1944 |
| 2,366,236 | Clark | Jan. 2, 1945 |